Figure 1:
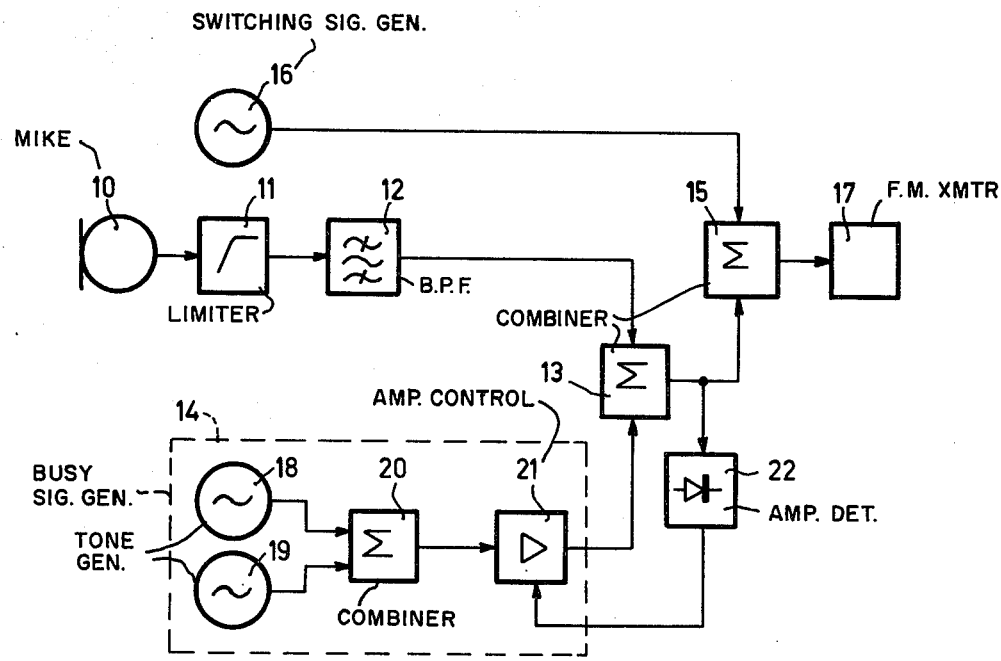

United States Patent [19]
Lundén

[11] 3,938,156
[45] Feb. 10, 1976

[54] RADIO COMMUNICATION TRANSMITTER

[75] Inventor: Peter L:Son Lundén, Jarfalla, Sweden

[73] Assignee: U.S. Philips Corporation, New York, N.Y.

[22] Filed: Feb. 20, 1974

[21] Appl. No.: 443,974

[30] Foreign Application Priority Data
Feb. 28, 1973 Sweden .............................. 7302804

[52] U.S. Cl. ........ 343/207; 179/15 BY; 179/15 FD; 325/155; 332/21
[51] Int. Cl.² ......................................... H04B 1/02
[58] Field of Search ....... 179/15 BP, 15 BY, 15 FD; 325/47, 55, 64, 139, 147, 155, 157; 343/177, 179, 207; 332/21, 22, 19

[56] References Cited
UNITED STATES PATENTS

| | | | |
|---|---|---|---|
| 3,376,509 | 4/1968 | Willcox et al. | 325/57 |
| 3,452,156 | 6/1969 | Engelbrecht | 179/15 FD |
| 3,477,042 | 11/1969 | Wachs | 332/16 |
| 3,617,892 | 11/1971 | Hawley et al. | 325/145 |

Primary Examiner—Benedict V. Safourek
Assistant Examiner—Marc E. Bookbinder
Attorney, Agent, or Firm—Frank R. Trifari; Henry I. Steckler

[57] ABSTRACT

A multi-channel radio communication system comprising a number of stations for the transmission of speech between the stations, each station transmitting not only the speech signal but also a special so-called busy signal located in a frequency band beyond the speech frequency band, which busy signal informs the remaining stations in the group of which are not occupied by a call to another station that the actual carrier frequency or channel is occupied and cannot be selected for a new connection. According to the invention the busy signal is automatically controlled in amplitude as a function of the instantaneous value of the speech signal and this in such a manner that the envelope of the combination of the speech signal and the busy signal is maintained substantially constant so that as a result of the normal interruptions in a conversation the busy signal will be automatically and repeatedly adjusted to full amplitude.

3 Claims, 2 Drawing Figures

RADIO COMMUNICATION TRANSMITTER

The invention relates to a radio communication system comprising a number of stations each consisting of a transmitter section for the transmission of a carrier signal modulated with speech information and a receiver section for the reception and demodulation of a carrier signal originating from another station, each station transmitting in addition to the information signal a special busy signal located in a frequency band beyond the information signal band.

The busy signal which may be a special code signal, for example one or two tone frequencies of five located in a frequency band above the speech frequency band informs the remaining stations in the system that a signal on a given carrier frequency or so-called channel conveying the special busy signal originates from a station within the system and that the relevant channel is occupied, while the reception of a channel frequency without a busy signal indicates that the relevant channel may be free. This information can then be utilised for automatically selecting a channel under given operating conditions while at the same time the risk of breaking into an occupied channel will be minimum.

An object of the invention is to increase the reception of the busy signal at a given mutually equal channel spacing.

According to the invention, in a system of the kind described in the preamble the transmitter section comprises a combination device for continuously adding the busy signal to the speech information signal before modulation on the carrier, and an amplitude control device varies the amplitude of the busy signal prior to its combination with the speech information signal, in such a manner that the envelope of the combined signal has a substantially constant amplitude.

When using the measures according to the invention the busy signal fills up the instantaneous amplitude variations of the speech information signal. Accordingly during the interruptions in the speech signal the busy signal will automatically be increased in amplitude so that the entire amplitude range available for the speech signal will be occupied by the busy signal, i.e. at FM modulation the entire frequency range available for the speech signal.

In those cases where a special signal, for example, a switching signal is transmitted together with the busy signal and the speech signal on the common carrier, the frequency band available for the speech signal is generally much larger than the frequency band available for such a switching signal. The requirement that the busy signal must have a larger reception range than the said switching signal will be automatically satisfied so that the risk of the channel selector selecting a channel which is already occupied is much smaller.

Figure 2:
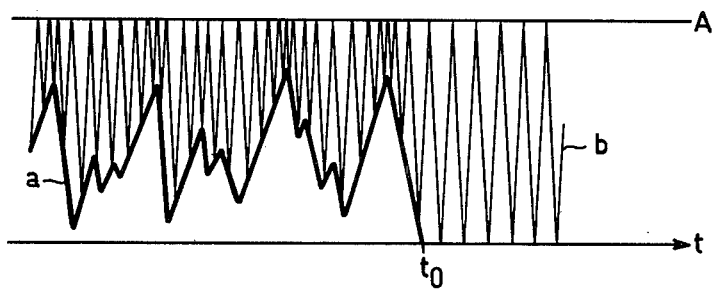

The invention will be described in greater detail with reference to the drawing in which FIG. 1 shows a block diagram of the transmitter section in a a radio communication system according to the invention and in which not only the speech information signal but also a special busy signal is transmitted on the common carrier and FIG. 2 shows a time diagram illustrating the operation of the system according to FIG. 1.

In FIG. 1 the speech signal is applied from a microphone 10 through an amplitude limiter 11 and a bandpass filter 12 to a combination device 13. The speech signal is combined in this combination device 13 with a busy signal generated by a signal generator 14, which will be described hereinafter. The sum signal of the device 13 is subsequently applied to a further combination device 15 in which this signal is combined with a switching signal generated by a signal generator 16. This switching signal may have, for example, a frequency which is located in a frequency band below the speech frequency band, for example, 150 Hz. The sum signal of the device 15 which is composed of the three sub-signals is finally applied to an FM transmitter 17 in which it is modulated on a carrier and transmitted.

In the embodiment shown the busy signal generated by the generator consists of a coded signal comprising two tones out of five, which selected tones are generated by two tone generators 18 and 19. The tone frequencies in the busy signal are located in a frequency band above the speech frequency band, for example, in the band of from 3,4 to 6 kHz. The two tone frequencies are combined in a combination device 20 and subsequently applied through an amplitude control device 21 to the combination device 13 so as to be combined with the speech signal. In the embodiment shown the amplitude control device consists of a controllable amplifier. The control signal for this amplifier is derived from an amplitude detector 22 connected to the output of the combination device 13. This detector has a long time constant, preferably a longer time constant than the duration of one period of the lowest frequency in the speech signal, i.e. approximately 3 ms. The detector is formed in such a manner that it supplies an output signal which is a measure of the deviation from the value of the instantaneous amplitude envelope of the combined signal relative to a fixed reference value. The gain of the amplifier 21 is controlled by the detector output signal in such a manner that the deviation from the said amplitude envelope relative to the said reference value is reduced to zero so that the amplitude envelope of the combined signal is maintained constant. The constant amplitude value at which the combined signal is adjusted is preferably chosen to be equal to the limit value of the limiter 11 which limits the amplitude of the speech signal. This means that at the instants when the speech signal has its maximum amplitude the busy signal will decrease to zero, whereas the amplitude difference between the instantaneous amplitude of the speech signal and the said maximum value will be filled up by the busy signal when the speech signal has a lower value.

The function is illustrated by the time diagram in FIG. 2 in which (a) shows a speech signal and (b) represents the busy signal which in this embodiment is shown as a single frequency for the sake of simplicity, while A is the reference value at which the control circuit adjusts the amplitude of the combined signal. It is evident from FIG. 2 that in case of an interruption in the speech signal (the instant $t_o$) the busy signal automatically has the same amplitude level as the maximum speech signal amplitude.

As described, the said switching signal which has a frequency below the speech frequency band is furthermore added to the combination signal constituted by the speech signal and the busy signal. The combination of all three sub-signals then serves for frequency modulation of the carrier in the FM transmitter 17. The frequency band which is available for each carrier channel in the transmitter 17 is limited to a given bandwidth and may be, for example, 10 kHz. The amplitude ratios between the switching signal and the combination signal constituted by the speech signal and the busy signal, which according to the foregoing has a constant amplitude, is then such that said combination signal occupies the larger part of the available frequency band. In the given embodiment the amplitude of the switching signal may correspond to, for example, a frequency sweep of 3kHz while the speech signal and the busy signal with a maximum amplitude correspond to a frequency sweep of 7 kHz.

Consequently the busy signal will have a larger reception range than the switching signal because the busy signal has its maximum amplitude value every time during an interruption in the speech signal.

Instead of controlling the gain or attenuation factor for the busy signal as a function of a signal representing the amplitude of the combination signal constituted by the information signal and the busy signal it is alternatively possible to control the said factor in a different manner, for example, as a function of a signal derived from a detector connected to the output of the microphone and being responsive to the amplitude of the speech signal, while the amplitude of the busy signal decreases as the amplitude of the speech signal increases, and conversely.

What is claimed is:

1. A radio transmitter comprising:
   means for providing a speech signal in a selected band,
   means for generating a busy signal outside of said selected band,
   means for adding said speech and busy signals to provide a sum signal,
   envelope signal producing means responsive to at least said speech signal to provide an envelope signal which varies with the instantaneous speech amplitude,
   means for varying the amplitude of said busy signal in accordance with said envelope signal to provide said sum signal at constant amplitude,
   means for transmitting said constant amplitude sum signal in a single selected channel.

2. A transmitter as claimed in claim 1, wherein said envelope producing means is coupled to an output of said adding means and to said varying means.

3. A transmitter as claimed in claim 1 further comprising means for generating a switching signal located in another frequency band other than the frequency band available for the speech information signal and the busy signal, and a second means for adding said switching signal to the sum signal.

* * * * *